United States Patent
Yang

(10) Patent No.: US 11,474,367 B2
(45) Date of Patent: Oct. 18, 2022

(54) SPECKLE ELIMINATION APPARATUS, LASER LIGHT SOURCE AND LASER PROJECTION SYSTEM

(71) Applicant: GOERTEK INC., Shandong (CN)

(72) Inventor: Lebao Yang, Shandong (CN)

(73) Assignee: GOERTEK INC., Shandong (CN)

( * ) Notice: Subject to any disclaimer, the term of this patent is extended or adjusted under 35 U.S.C. 154(b) by 291 days.

(21) Appl. No.: 16/753,600

(22) PCT Filed: Dec. 8, 2017

(86) PCT No.: PCT/CN2017/115239
§ 371 (c)(1),
(2) Date: Apr. 3, 2020

(87) PCT Pub. No.: WO2019/100452
PCT Pub. Date: May 31, 2019

(65) Prior Publication Data
US 2020/0333616 A1    Oct. 22, 2020

(30) Foreign Application Priority Data
Nov. 22, 2017 (CN) .......................... 201721571861.0

(51) Int. Cl.
G02B 27/48 (2006.01)
G03B 21/20 (2006.01)
G02B 27/28 (2006.01)

(52) U.S. Cl.
CPC .......... *G02B 27/48* (2013.01); *G02B 27/286* (2013.01); *G03B 21/2033* (2013.01)

(58) Field of Classification Search
CPC ...... G02B 27/48; G02B 27/286; G03B 21/00; G03B 21/14; G03B 21/2033
USPC ........................................................ 353/97
See application file for complete search history.

(56) References Cited

U.S. PATENT DOCUMENTS

| 8,172,404 B2 * | 5/2012 | Silverstein | G03B 21/208 |
| | | | 353/38 |
| 2012/0062848 A1 * | 3/2012 | Koyanagi | G02B 27/286 |
| | | | 353/20 |
| 2020/0201161 A1 * | 6/2020 | Tian | H04N 9/3161 |
| 2020/0218081 A1 * | 7/2020 | Yang | G02B 27/48 |
| 2020/0301158 A1 * | 9/2020 | Yang | G02B 27/288 |

* cited by examiner

*Primary Examiner* — William C. Dowling
(74) *Attorney, Agent, or Firm* — Paratus Law Group, PLLC

(57) ABSTRACT

A speckle elimination apparatus, a laser light source and a laser projection system, the speckle elimination apparatus comprising a diaphragm (100) and a ¼ wave plate group sequentially arranged on a laser beam optical path, the ¼ wave plate group comprising a first ¼ wave plate (200) and a second ¼ wave plate (300) having optical axis angles of 75°-105°, adjacent sides of the first ¼ wave plate (200) and the second ¼ wave plate (300) being closely arranged, the first ¼ wave plate (200) being arranged so as to allow a portion of an incident laser beam to pass through, the second ¼ wave plate (300) being arranged so as to allow the remainder of the incident laser beam to pass through, the portion of the incident laser beam being 25%-75% of the incident laser beam. The speckle elimination apparatus eliminates the phenomenon of laser speckle.

17 Claims, 1 Drawing Sheet

US 11,474,367 B2

SPECKLE ELIMINATION APPARATUS, LASER LIGHT SOURCE AND LASER PROJECTION SYSTEM

CROSS REFERENCE TO PRIOR APPLICATION

This application is a National Stage Patent Application of PCT International Patent Application No. PCT/CN2017/115239 (filed on Dec. 8, 2017) under 35 U.S.C. § 371, which claims priority to Chinese Patent Application No. 201721571861.0 (filed on Nov. 22, 2017), which are all hereby incorporated by reference in their entirety.

FIELD OF THE INVENTION

The present invention relates to the field of laser technologies, and in particular to a speckle elimination apparatus, a laser light source and a laser projection system.

BACKGROUND OF THE INVENTION

The laser light source has features such as high monochromaticity, high coherence, high directivity, and high brightness. When the laser light source is used as a light source of a projection system, the laser beam itself may generate spot interference (self-coherence) due to the high coherency of laser. The conditions for generating the self-coherence by the laser beam are: laser frequencies are the same, vibration directions are identical, and the phase difference is constant. The spot interference may result in the formation of stray light with nonuniform brightness at the side of a laser emergent spot, which is referred to as a laser speckle. The laser speckle phenomenon may affect the imaging effect of the projection. Therefore, a speckle elimination apparatus that can eliminate the laser speckle phenomenon by dividing the laser beam into two portions having different vibration directions, a laser light source, and a laser projection system need to be provided.

SUMMARY OF THE INVENTION

The objective of the present invention is to provide a speckle elimination apparatus, a laser light source, and a laser projection system, to eliminate a laser speckle phenomenon by changing a polarization state of a portion of a whole laser beam.

In order to achieve the above objective, the present invention adopts the following technical solutions.

The present invention discloses a speckle elimination apparatus, comprising a diaphragm and a ¼ wave plate group sequentially arranged on a laser beam optical path, wherein the ¼ wave plate group comprises a first ¼ wave plate and a second ¼ wave plate, wherein the optical axis of the first ¼ wave plate and the optical axis of the second ¼ wave plate form an included angle of 75°-105°; adjacent sides of the first ¼ wave plate and the second ¼ wave plate are closely arranged; the first ¼ wave plate is arranged to allow a portion of an incident laser beam to pass through, the second ¼ wave plate is arranged to allow the remainder of the incident laser beam to pass through, and the portion of the incident laser beam occupies 25%-75% of the incident laser beam.

Preferably, the portion of the incident laser beam occupies 50% of the incident laser beam.

Preferably, the included angle between the optical axis of the first ¼ wave plate and the optical axis of the second ¼ wave plate is 90°.

Preferably, the adjacent sides of the first ¼ wave plate and the second ¼ wave plate are fixedly bonded to each other.

Preferably, the first ¼ wave plate and the second ¼ wave plate are rectangular-shaped, semicircular-shaped, or semioval-shaped ¼ wave plates respectively.

Preferably, the first ¼ wave plate is an annular ¼ wave plate having a central opening, and the second ¼ wave plate is a ¼ wave plate that matches a shape of the opening.

Preferably, the first ¼ wave plate is an annular ¼ wave plate having a central opening of a centrosymmetric shape, the annular ¼ wave plate being concentrically arranged with a light through hole of the diaphragm.

Preferably, the first ¼ wave plate is an annular ¼ wave plate having a central circular opening.

The present invention further discloses a laser light source, comprising a laser device for emitting a laser beam, and further comprising the speckle elimination apparatus described above.

The present invention further discloses a laser projection system, comprising the laser light source described above.

The present invention has the following beneficial effects:

According to the technical solutions of the present invention, the laser speckle phenomenon can be eliminated by dividing the laser beam into two portions having different vibration directions (i.e., polarization states), thereby eliminating the effect of the laser speckle phenomenon on a laser imaging picture. In addition, the technical solutions of the present invention has a small size, a simple structure, and high reliability.

BRIEF DESCRIPTION OF THE DRAWINGS

The specific embodiments of the present invention will be further described below with reference to the drawings.

DETAILED DESCRIPTION OF THE PREFERRED EMBODIMENTS

Figure 1:
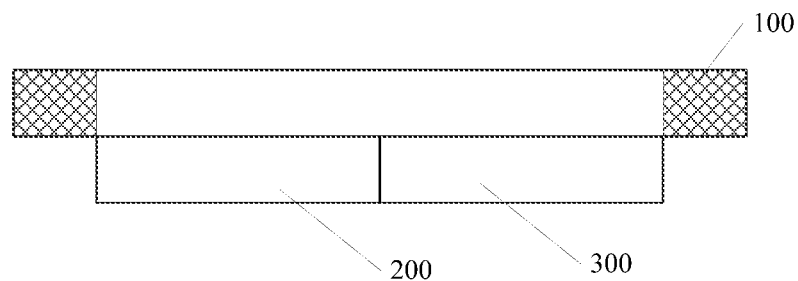
FIG. 1 illustrates a sectional view of a speckle elimination apparatus.

In order to describe the present invention more clearly, the present invention will be further described below in combination with the preferred embodiments and the drawings. Similar components in the drawings are denoted by the same reference signs. Those skilled in the art should understand that the following detailed description is merely for illustration instead of limitation, and the protection scope of the present invention shall not be limited thereto.

Figure 2:
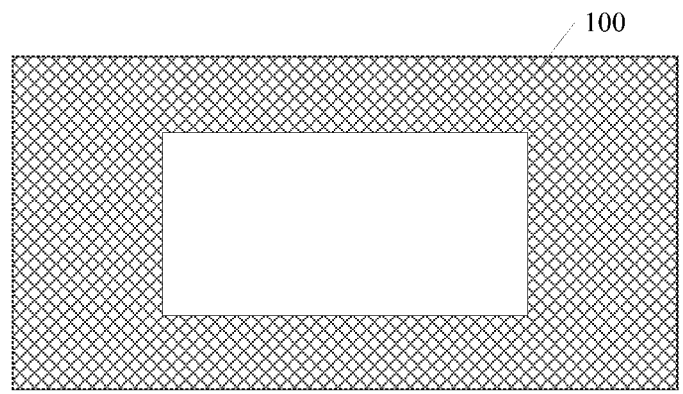
FIG. 2 illustrates a top view of a diaphragm.
Figure 3:
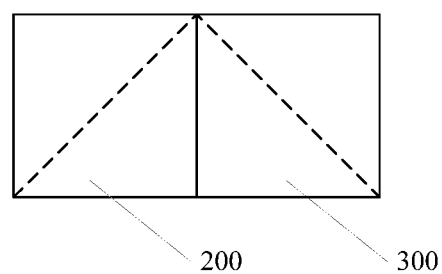
FIG. 3 illustrates a top view of a first ¼ wave plate and a second ¼ wave plate.

As shown in FIGS. 1-3, a speckle elimination apparatus provided by this embodiment comprises a diaphragm 100 and a ¼ wave plate group sequentially arranged on a laser beam optical path, wherein the ¼ wave plate group comprising a first ¼ wave plate 200 and a second ¼ wave plate 300 having optical axes forming an included angle of 75°-405°, adjacent sides of the first ¼ wave plate 200 and the second ¼ wave plate 300 are closely arranged, the first ¼ wave plate 200 is arranged to allow a portion of an incident laser beam to pass through, the second ¼ wave plate 300 is arranged to allow the remainder of the incident laser beam to pass through, and the portion of the incident laser beam is 25%-75% of the incident laser beam.

In the speckle elimination apparatus provided by this embodiment, after the incident laser beam passes through the diaphragm 100, a vibration direction (i.e., polarization state) of the portion of the incident laser beam that passes through the first ¼ wave plate 200 is changed by the first ¼ wave plate 200, while a vibration direction (i.e., polarization state) of the remainder of the incident laser beam that passes through the second ¼ wave plate 300 is changed by the second ¼ wave plate 300. Since the included angle between the optical axis of the first ¼ wave plate 200 and the optical axis of the second ¼ wave plate 300 comprised in the ¼ wave plate group is 75°-105°, the vibration directions (i.e., polarization states) of the portion of the laser beam that passes through the first ¼ wave plate 200 and the remainder of the laser beam that passes through the second ¼ wave plate 300 are different. For example, when the incident laser beam is an S-linearly polarized light beam, after the S-linearly polarized light beam passes through the diaphragm 100, a portion of the incident laser beam that passes through the first ¼ wave plate 200 is converted into a left-handed polarized light beam, the remainder of the incident laser beam that passes through the second ¼ wave plate 300 is converted into a right-handed polarized light beam, and vibration directions of the left-handed polarized light beam and the right-handed polarized light beam are different. In this way, the speckle elimination apparatus provided by this embodiment divides the incident laser beam into two portions having different vibration directions (i.e., polarization states), and since the vibration directions (i.e., polarization states) of the two portions are different, interference will not be formed between the two portions, thereby eliminating a laser speckle phenomenon of the incident laser beam, and thus eliminating the effect of the laser speckle phenomenon on a laser imaging picture.

In a specific implementation, the portion of the incident laser beam occupies 50% of the incident laser beam. In this case, each of laser beams passing through the first ¼ wave plate 200 and the second ¼ wave plate 300 occupy a half of the whole laser beam, achieving a better effect of eliminating the laser speckle phenomenon of the incident laser beam.

In a specific implementation, as shown in FIG. 3, the included angle between the optical axes of the first ¼ wave plate 200 and the second ¼ wave plate 300 is 90°, and dotted lines in FIG. 3 represent the optical axes. In this case, the vibration directions of the portion of the laser beam that passes through the first ¼ wave plate 200 and the remainder of the laser beam that passes through the second ¼ wave plate 300 are perpendicular to each other, achieving a better effect of eliminating the laser speckle phenomenon of the incident laser beam.

In a specific implementation, the ¼ wave plate group and the diaphragm 100 are closely arranged in a direction of the laser beam optical path. In this case, an effect of limiting the incident laser beam by the diaphragm 100 is better, and miniaturization of the speckle elimination apparatus becomes possible, thereby saving the space and reducing an overall volume of the apparatus.

In a specific implementation, the adjacent sides of the first ¼ wave plate 200 and the second ¼ wave plate 300 are fixedly bonded to each other. In addition, material of the first ¼ wave plate 200 and the second ¼ wave plate 300 are not limited in this embodiment, and the material thereof can be different.

In a specific implementation, as a preferred manner, the first ¼ wave plate 200 and the second ¼ wave plate 300 are rectangular-shaped, semicircular-shaped, or semioval-shaped ¼ wave plates respectively. That is, both the first ¼ wave plate 200 and the second ¼ wave plate 300 are rectangular-shaped, semicircular-shaped (planar sides of semicircles are closely arranged), or semioval-shaped (planar sides of semiovals are closely arranged). Certainly, the above preferred shapes are used to facilitate production and close arrangement of the first ¼ wave plate 200 and the second ¼ wave plate 300. In addition to the above preferred shapes, the first ¼ wave plate 200 and the second ¼ wave plate 300 can be in other shapes, and the shapes thereof may be different.

In a specific implementation, as another preferred manner, the first ¼ wave plate 200 is an annular ¼ wave plate having a central opening, and the second ¼ wave plate 300 is a ¼ wave plate that matches a shape of the opening. In this case, those skilled in the art could understand that "the adjacent sides of the first ¼ wave plate 200 and the second ¼ wave plate 300 are closely arranged" means that an inner side surface of the opening of the annular ¼ wave plate and an outer side surface of the ¼ wave plate that matches the opening are closely arranged. Further preferably, the first ¼ wave plate 200 is an annular ¼ wave plate having a central opening of a centrosymmetric shape, the annular ¼ wave plate having a central opening of a centrosymmetric shape being concentrically arranged with a light through hole of the diaphragm; and correspondingly, the second ¼ wave plate 300 is a centrosymmetric-shaped ¼ wave plate that matches a shape of the centrosymmetric-shaped opening, in which case a positional relationship between the annular ¼ wave plate having a central opening of a centrosymmetric shape and the diaphragm 100 on the optical path can be easily adjusted. Most preferably, the first ¼ wave plate 200 is an annular ¼ wave plate having a central circular opening, and correspondingly, the second ¼ wave plate 300 is a circular ¼ wave plate that matches a shape of the circular opening.

Further, this embodiment provides a laser light source, comprising a laser device for emitting a laser beam and the speckle elimination apparatus described above, wherein a laser speckle phenomenon can be eliminated after the laser beam emitted by the laser device passes through the speckle elimination apparatus.

Further, this embodiment provides a laser projection system comprising the laser light source described above.

In the description of the present invention, it should be noted that the orientation or positional relationship indicated by the terms such as "upper", or "lower" is based on the orientation or positional relationship shown in the drawings, and is merely for convenience in description of the present invention and simplification of the description, instead of an indication or implication that the apparatus or component necessarily has a specific orientation, or is constructed and operated in a specific orientation, thus cannot be construed as a limitation to the present invention. Unless specifically stated and limited, the terms "mounted", "bonded", and "connected" should be understood in a broad sense, and may be, for example, a fixed connection, a detachable connection, or an integral connection; may be a mechanical connection, or an electrical connection; may be a direct connection, an indirect connection via an intermediate medium, or an inner connection between two components. For those skilled in the art, the specific meanings of the above terms in the present invention can be understood according to specific situations.

It should also be noted that in the description of the present invention, relational terms such as first and second are merely used to distinguish one entity or operation from another entity or operation, without necessarily requiring or implying that there is any such actual relationship or sequence between these entities or operations. Furthermore, the term "comprise" or "contain" or any other variations thereof is intended to encompass a non-exclusive inclusion, such that a process, a method, an item, or a device that includes a series of elements includes not only those elements but also other elements which are not explicitly listed, or further includes elements inherent to such the process, method, item, or device. In the case of no more limitation, an element defined by the phrase "comprising a . . . " does not exclude the presence of additional equivalent elements in the process, method, item, or device that comprises the element.

Obviously, the embodiments of the present invention described above are merely examples for clear illustration of the present invention, instead of a limitation to the implementations of the present invention. Based on the above description, those skilled in the art could make variations or modifications in other different forms. All the implementations cannot be exhaustively listed herein, and any obvious variations or modifications derived from the technical solutions of the present invention still fall within the protection scope of the present invention.

The invention claimed is:

1. A speckle elimination apparatus, comprising a diaphragm and a ¼ wave plate group sequentially arranged on a laser beam optical path,
wherein the ¼ wave plate group comprises a first ¼ wave plate and a second ¼ wave plate, wherein an optical axis of the first ¼ wave plate and an optical axis of the second ¼ wave plate form an included angle of 75°-105°, adjacent sides of the first ¼ wave plate and the second ¼ wave plate are closely arranged, the first ¼ wave plate is arranged to allow a portion of an incident laser beam to pass through, the second ¼ wave plate is arranged to allow a remainder of the incident laser beam to pass through, the portion of the incident laser beam occupies 25%-75% of the incident laser beam, and the diaphragm is attached to the ¼ wave plate group in a direction orthogonal to a direction of the laser beam optical path.

2. The speckle elimination apparatus according to claim 1, wherein the portion of the incident laser beam occupies 50% of the incident laser beam.

3. The speckle elimination apparatus according to claim 1, wherein the included angle between the optical axis of the first ¼ wave plate and the optical axis of the second ¼ wave plate is 90°.

4. The speckle elimination apparatus according to claim 1, wherein the adjacent sides of the first ¼ wave plate and the second ¼ wave plate are fixedly bonded to each other.

5. The speckle elimination apparatus according to claim 1, wherein the first ¼ wave plate and the second ¼ wave plate are rectangular-shaped, semicircular-shaped, or semioval-shaped ¼ wave plates respectively.

6. The speckle elimination apparatus according to claim 1, wherein the first ¼ wave plate is an annular ¼ wave plate having a central opening, and the second ¼ wave plate is a ¼ wave plate that matches a shape of the opening.

7. The speckle elimination apparatus according to claim 6, wherein the first ¼ wave plate is an annular ¼ wave plate having a central opening of a centrosymmetric shape, the annular ¼ wave plate is concentrically arranged with a light through hole of the diaphragm.

8. The speckle elimination apparatus according to claim 7, wherein the first ¼ wave plate is an annular ¼ wave plate having a central circular opening.

9. A laser light source, comprising a laser device for emitting a laser beam, and further comprising the speckle elimination apparatus according to claim 1.

10. A laser projection system, comprising the laser light source according to claim 9.

11. A laser light source, comprising a laser device for emitting a laser beam, and further comprising the speckle elimination apparatus according to claim 2.

12. A laser light source, comprising a laser device for emitting a laser beam, and further comprising the speckle elimination apparatus according to claim 3.

13. A laser light source, comprising a laser device for emitting a laser beam, and further comprising the speckle elimination apparatus according to claim 4.

14. A laser light source, comprising a laser device for emitting a laser beam, and further comprising the speckle elimination apparatus according to claim 5.

15. A laser light source, comprising a laser device for emitting a laser beam, and further comprising the speckle elimination apparatus according to claim 6.

16. A laser light source, comprising a laser device for emitting a laser beam, and further comprising the speckle elimination apparatus according to claim 7.

17. A laser light source, comprising a laser device for emitting a laser beam, and further comprising the speckle elimination apparatus according to claim 8.

* * * * *